United States Patent [19]

Crivello

[11] 4,238,587
[45] * Dec. 9, 1980

[54] HEAT CURABLE COMPOSITIONS

[75] Inventor: James V. Crivello, Clifton Park, N.Y.

[73] Assignee: General Electric Company, Schenectady, N.Y.

[*] Notice: The portion of the term of this patent subsequent to Nov. 6, 1996, has been disclaimed.

[21] Appl. No.: 98,096

[22] Filed: Nov. 28, 1979

Related U.S. Application Data

[63] Continuation-in-part of Ser. No. 58,318, Jul. 17, 1979, which is a continuation-in-part of Ser. No. 962,997, Nov. 22, 1978, abandoned, which is a continuation-in-part of Ser. No. 861,127, Dec. 16, 1977, abandoned.

[51] Int. Cl.$^3$ .............................................. C08J 4/44
[52] U.S. Cl. .............................. 526/192; 264/328.1; 521/99; 521/107; 521/125; 521/154; 521/178; 521/181; 521/182; 526/273; 526/290; 528/92; 528/139; 528/275; 528/361; 528/409

[58] Field of Search .................. 526/192, 290, 273; 528/92, 139, 275, 409

[56] References Cited

U.S. PATENT DOCUMENTS

| | | | |
|---|---|---|---|
| 3,691,133 | 9/1972 | Sura | 528/88 |
| 4,058,401 | 11/1977 | Crivello | 96/115 R |
| 4,069,055 | 1/1978 | Crivello | 96/115 R |
| 4,173,551 | 11/1979 | Crivello | 528/408 |

*Primary Examiner*—Morton Foelak
*Attorney, Agent, or Firm*—William A. Teoli; James C. Davis, Jr.

[57] ABSTRACT

Diaryliodonium salts have been found to be effective thermal initiators for the polymerization of a variety of cationically polymerizable materials including epoxides, cyclic ethers, phenol formaldehyde resins, etc., when used in combination with various cocatalysts. Among the cocatalysts which have been found to be effective are, for example, copper chelates and mixtures of such copper chelates with various reducing agents such as ascorbic acid, tin$^{+2}$ salts, etc.

21 Claims, No Drawings

HEAT CURABLE COMPOSITIONS

This application is a continuation-in-part of my copending application Ser. No. 58,318, filed July 17, 1979 which is a continuation-in-part application of Ser. No. 962,997, filed Nov. 22, 1978, now abandoned, which is a continuation-in-part of application Ser. No. 861,127, filed Dec. 16, 1977, now abandoned. This application is also a continuation-in-part of my copending application Ser. No. 67,027, filed Aug. 16, 1979 which is a continuation-in-part of Ser. No. 861,128, filed Dec. 16, 1977, now U.S. Pat. No. 4,173,551, where all of these applications are incorporated herein by reference and assigned to the same assignee as the present invention.

BACKGROUND OF THE INVENTION

The present invention relates to the use of diaryliodonium salts in combination with certain copper chelates or mixtures thereof with certain reducing agents as cocatalysts for the heat cure of a variety of cationically polymerizable organic materials.

As shown in my U.S. Pat. No. 4,173,551, assigned to the same assignee as the present invention, diaryliodonium salts and copper salts or mixtures of copper salts and organic acids have been found to be useful for effecting the polymerization of a variety of cationically polymerizable organic materials. In my above-identified copending application Ser. No. 58,318, valuable results were achieved when aromatic iodonium salts were utilized in combination with various reducing agents to effect the low temperature cure of a variety of organic polymerizable materials. I have found that copper chelates, or mixtures of such copper chelates and reducing agents when used at effective levels, will also initiate to a surprising degree the cationic cure of a variety of organic materials when used in combination with diaryliodonium salts.

STATEMENT OF THE INVENTION

There is provided by the present invention, curable compositions comprising (A) a cationically polymerizable organic material, (B) a diaryliodonium salt and (C) a member selected from a copper chelate and a mixture of a copper chelate and a reducing agent.

The diarylidonium salts which can be utilized in the practice of the invention are shown as follows:

$$[(R)_a(R^1)_bI]^+[Y]^-, \quad (1)$$

where R is a $C_{(6-13)}$ aromatic hydrocarbon radical, $R^1$ is a divalent aromatic organic radical, and Y is an anion, a is equal to 0 or 2, b is equal to 0 or 1 and the sum of a+b is equal to 1 or 2. Preferably, Y is an $MQ_d$ anion where M is a metal or metalloid, Q is a halogen radical and d is an integer equal to 4-6. Y also can be a counterion ion such as perchlorate, $CF_3SO_3^-$, $C_6H_5SO_3^-$, $Cl^-$, $Br^-$, F, nitrate, phosphate, etc.

Radicals included within R of formula (1) can be the same or different aromatic carbocyclic radicals having from 6 to 20 carbon atoms, which can be substituted with from 1 to 4 monovalent radicals selected from $C_{(1-8)}$ alkoxy, $C_{(1-8)}$ alkyl, nitro, chloro, etc. R is more particularly, phenyl, chlorophenyl, nitrophenyl, methoxyphenyl, pyridyl, etc. Radicals included by $R^1$ of formula (1) are divalent radicals such as

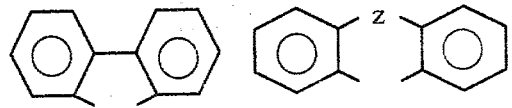

where Z is selected from —O—, —S—,

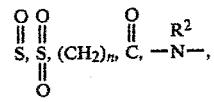

$R^2$ is $C_{(1-8)}$ alkyl or $C_{(6-13)}$ aryl, and n is an integer equal to 1–8 inclusive.

Metals or metalloids included by M of formula (1) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, Sb, etc. Complex anions included by $MQ_d$ are, for example, $BF_4^-$, $PF_6^-$, $AsF_6^-$, $SbF_6^-$, $FeCl_4^-$, $SnCl_6^-$, $SbCl_6^-$, $BiCl_5^{--}$, etc.

Some of the diaryliodonium salts which can be used in the practice of the invention are as follows:

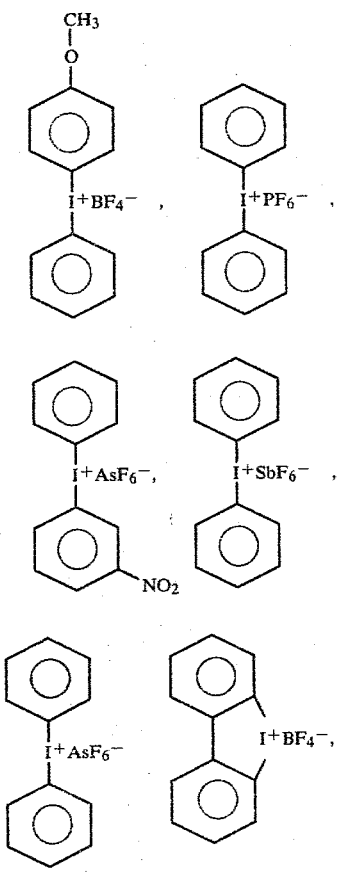

Copper chelates which can be used in the practice of the invention are shown in Cotton and Wilkinson, Advanced Inorganic Chemistry, 3rd Edition, Interscience Publishers, New York, 1972, pages 905 to 922. Copper chelates which are preferred, are those compounds which can be readily incorporated or dispersed in the cationically polymerizable material, as defined hereinafter, for example, an epoxide resin, or by an in situ reaction, or in a carrier solvent. Additional reference is made to the definition of chelate in Kirk-Othmer, Encyclopedia of Chemical Technology 3rd Edition, Vol. 5, pp. 339–367 (1979) John Wiley and Sons, New York.

Some of the copper chelates which are included within the scope of the present invention are, for example, copper acetyl acetonate, copper salicylate, $CuI(C_6H_5)_3P$, $CuI(C_2H_5O)_3P$, $CuCl_2C_2H_8N_2$,

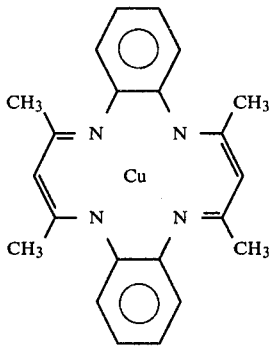

$[(N-C_4H_9)_4N]_2 CuCl_4$,

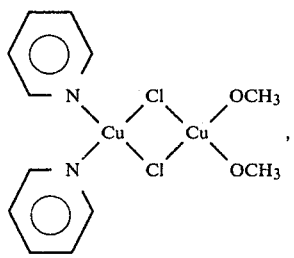

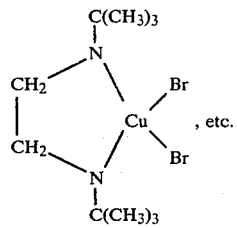, etc.

The term reducing agent as used in the present invention includes any organic or inorganic compound or polymer capable of lowering or reducing the charge of the hetero atom of the diaryliodonium salt. There are included, for example, ascorbic acid and its derivatives, such as ascorboyl palmitate, ascorboyl oleate, ascorboyl acetate, etc.; tin ($Sn^{+2}$) compounds also can be used, for example, $Sn^{+2}$ carboxylic acid salts, e.g., stannous octoate, stannous stearate, stannous laurate, stannous citrate, stannous oxalate, stannous benzoate, etc. Among organic compounds there are included α-hydroxy compounds, for example, ketones such as acyloins and benzoins,

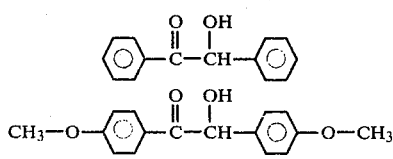

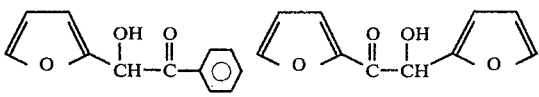

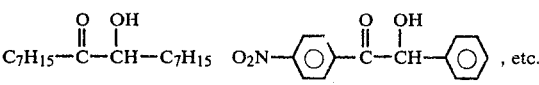, etc.

There are also included iron ($Fe^{+2}$) compounds, for example, ferrocene, $FeBr_2$, $FeCl_2$, etc; reducing sugars, such as glucose, fructose, galactose; etc., phenols, for example, thiophenol, etc.; silanes, for example, $Si(H)_c(R^2)_d$ compounds, where $R^2$ is defined above, c is an integer having a value of 1 to 4 inclusive, d is a whole number equal to 0 to 3, and the sum of $c+d=4$; SiH containing organosiloxane, etc.

In addition to ascorbic acid and α-hydroxy ketones, other activated α-hydroxy compounds which can be used with copper chelates as defined above, are included by the following

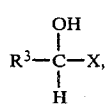

where $R^3$ is a $C_{(1-20)}$ alkyl radical, or $C_{(6-20)}$ aryl radical and X is a monovalent radical selected from the class of nitro, halo, sulfone, $CO_2R^4$, cyano,

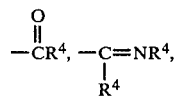

—$CCl_3$ and $CHCl_2$, where $R^4$ is selected from hydrogen and $R^3$.

The term cationically polymerizable organic material includes epoxy resins, thermosetting organic polyorganic condensation resins of formaldehyde, vinyl organic prepolymers, cyclic ethers, organo silicon cyclics, etc.

The term "epoxy resin" as utilized in the description of the cationically polymerizable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenolformaldehyde resin (Novolak resin) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxysiloxane resins, epoxy-polyurethanes and epoxy-polyesters. Such polymers usually have epoxy functional groups at the ends of their chains. Epoxy-siloxane resins and method for making are more particularly shown by E. P. Pluedemann and G. Fanger, J. Am. Chem. Soc., 80 632–5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,840; 3,567,797; 3,677,995; etc. Further coreactants which can be used with epoxy resins are hydroxy terminated flexibilizers such as hydroxy terminated polyesters, shown in the Encyclopedia of Polymer Science and Technology, Vol. 6, 1967, Interscience Publishers, New York, pp. 209,271 and particularly p. 238.

Included by the thermosetting organic condensation resins of formaldehyde which can be used in the practice of the present invention are, for example, urea type resins, phenol-formaldehyde type resin.

In addition, there can be used melamine thiourea resins, melamine, or urea aldehyde resins, cresole-formaldehyde resins and combinations with other carboxy, hydroxy, amino and mercapto containing resins, such as polyesters, alkyds and polysulfides.

Some of the vinyl organic prepolymers which can be used to make the polymerizable compositions of the present invention are, for example, $CH_2=CH-O-(CH_2-CH_2O)_{n'}-CH=CH_2$, where $n'$ is a positive integer having a value up to about 1000 or higher; multifunctional vinylethers, such as 1,2,3-propane trivinylether, trimethylolpropane trivinylether, prepolymers having the formula,

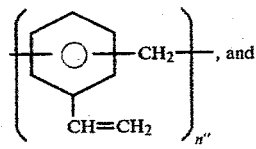

low molecular weight polybutadiene having a viscosity of from 200 to 10,000 centipoises at 25° C., etc. Products resulting from the cure of such compositions can be used as printing inks and other applications typical of thermosetting resins.

A further category of the organic materials which can be used to make the polymerizable compositions are cyclic ethers which are convertible to thermoplastics. Included by such cyclic ethers are, for example, oxetanes such as 3,3-bis-chloromethyloxetane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as α-lactones, for example propiolactone, cyclic amines, such as 1,3,3-trimethyl-azetidine and organo-silicone cyclics, for example, materials included by the formula,

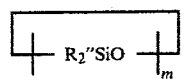

where R'' can be the same or different monovalent organic radical such as methyl or phenyl and m is an integer equal to 3 to 8 inclusive. An example of an organosilicone cyclic is hexamethyl trisiloxane, octamethyl tetrasiloxane, etc. The products made in accordance with the present invention are high molecular weight oils and gums.

In the practice of the present invention, the heat curable compositions can be made by blending the cationically polymerizable material, the diaryliodonium salt and the copper chelate. In instances where a low temperature cure of the cationically polymerizable material is desired, a reducing agent can be utilized in combination with the diaryliodonium salt and copper chelate.

Effective results have been achieved if there is employed by weight from 0.01% to 20% of the diaryliodonium salt, based on the weight of diaryliodonium salt and cationically polymerizable organic material. The weight of the copper chelate can vary between about 0.01 to 10 parts of copper chelate, per part of diaryliodonium salt. In instances where the reducing agent is employed, there can be used from 0.05 to 20 parts of reducing agent per part of the diaryliodonium salt. Overall, when the total parts of diaryliodonium salt, copper chelate and optionally reducing agent are considered together as the catalyst for the cationically polymerizable organic material, there can be used from 1% to about 35% of catalyst based on the combined weight of cationically polymerizable material and catalyst.

The resulting curable compositions can be in the form of a varnish having a viscosity of from 1 to 100,000 centipoises at 25° C. or a free-flowing powder, depending upon the nature of the cationically polymerizable organic material. The curable compositions can be applied to a variety of substrates by conventional means and cured to the tack-free state within 0.5 to 20 minutes depending upon the temperature employed.

In certain instances, an organic solvent, such as nitromethane, acetonitrile, can be used to facilitate the mixing of various ingredients. The diaryliodonium salts can be formed in situ if desired. In addition, the curable compositions may contain inactive ingredients, such as silica, talc, clay, glass fibers, extenders, hydrated alumina, carbon fibers, process aids, etc., in amounts of up to 500 parts of filler per 100 parts of cationically polymerizable organic material. The curable compositions can be applied to such substrates as metal, rubber, plastic, molded parts of films, paper, wood, glass, cloth, concrete, ceramic, etc.

Some of the applications in which the curable compositions of the present invention can be used are, for example, protective, decorative and insulating coatings, potting compounds, printing inks, sealants, adhesives, molding compounds, wire insulation, textile coatings, laminates, impregnated tapes, varnishes, reaction injection molding, pultrusion, filiment winding, etc.

In order that those skilled in the art will be better able to practice the invention, the following examples are given by way of illustration and not by way of limitation. All parts are by weight.

EXAMPLE 1

Heat curable compositions were prepared by adding 0.5% by weight of various copper nitrogen chelates to a 2% by weight solution of diphenyliodonium hexafluoroarsenate and Epon 828 ( a diglycidal ether of bisphenol-A). A mixture was also prepared free of the copper nitrogen chelate. The diphenyliodonium salt was utilized as a 50% solution in propylene carbonate. The heat curable compositions were placed in a forced air oven at 100° C. to determine the time required for gelling the mixture. The following results were obtained:

TABLE I

| Copper Chelate | Gel Time (min) |
| --- | --- |
| None | >165 |
| [(N—C$_4$H$_9$)$_4$N]$_2$CuCl$_4$ | 10 |
| (pyridine)$_2$Cu$_2$Cl$_2$(OCH$_3$)$_2$ chelate | 10 |
| (t-butylaminoethyl)CuBr$_2$ chelate | 20 |

The above results show that the copper nitrogen chelates of the present invention accelerate the cure of the epoxy resin to a surprising degree.

EXAMPLE 2

Example 1 was repeated, except that in place of the diphenyliodonium hexafluoroarsenate there was employed diphenyliodonium hexafluorophosphate. The following results were obtained:

TABLE II

| Copper Chelate | Gel Time (min) |
| --- | --- |
| None | >240 |
| [(n-C$_4$H$_9$)$_4$N]$_2$CuCl$_4$ | 9 |
| (pyridine)$_2$Cu$_2$Cl$_2$(OCH$_3$)$_2$ chelate | 15 |
| (t-butylaminoethyl)CuBr$_2$ chelate | 32 |

EXAMPLE 3

Example 1 was repeated, except that biscycloaliphatic epoxide 3,4-epoxycyclohexylmethyl-3',4'-epoxycyclohexane carboxylate (ERL 4221, of the Union Carbide Corporation) was employed as the epoxy resin. The following results were obtained:

TABLE III

| Copper Chelate | Gel Time (min) |
| --- | --- |
| None | >360 |
| [(n-C$_4$H$_9$)$_4$N]$_2$CuCl$_4$ | 10 |
| (pyridine)$_2$Cu$_2$Cl$_2$(OCH$_3$)$_2$ chelate | 10 |
| (t-butylaminoethyl)CuBr$_2$ chelate | 10 |

EXAMPLE 4

There was added 91 parts of the epoxy resin of Example 3, 6 parts of 50% solution of diphenyliodonium hexafluoroarsenate in propylene carbonate and 3 parts of stannous octoate. The resulting mixture was vigorously stirred and divided into 10 part aliquots to which various copper compounds were added respectively in 0.1 part amounts. The resulting mixtures were then stirred and allowed to rest under atmospheric conditions. Table IV shows the gel time obtained in minutes which were obtained from each of the mixtures containing a particular copper compound:

TABLE IV

| Copper Compound | Gel Time (min) |
| --- | --- |
| copper naphthenate | 0.8 |
| copper benzoate | 15.5 |
| copper salicylate | 12.4 |
| copper acetylacetonate | 16.4 |
| copper stearate | 47.5 |

The above results show that the effectiveness of copper chelates as redox catalysts as compared to copper salts.

EXAMPLE 5

A stock solution composed of 96 parts Epon 828 and 4 parts of a 50% solution of $(C_6H_5)_2I^+AsF_6^-$ in propylene carbonate was prepared. To 10 ml aliquots, there was added 0.5 g (0.5 parts) each of the copper compounds shown below. The gel times were measured in a forced air oven at 100° C.

| Compound | Cure Time (min) |
| --- | --- |
| copper benzoate | 28 |
| copper stearate | 48 |
| copper (II) chloride | >70 |

| Compound | Cure Time (min) |
|---|---|
| 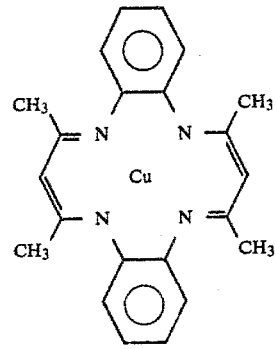 | 10 |

The above results further show the surprising results obtained with copper chelates as cocatalysts as compared to copper salts.

EXAMPLE 6

A solution composed of 98 parts diethyleneglycol divinylether and 4 parts of a 50% solution of $(C_6H_5)_2I^+PF_6^-$ in propylene carbonate was divided into 10 gram aliquots and the gel times at 100° C. were measured.

| Compound | Cure Time (min) |
|---|---|
| $(n-Bu_4N)_2CuCl_4$ | 2.5 |
|  | 2.5 |
| (copper chelate structure) | |
| copper stearate | 3.5 |
|  | 5.5 |
| 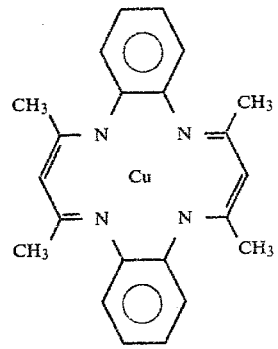 | |
| None | >9 |

Although the above results are directed to only a few of the very many variables within the scope of the present invention, it should be understood that the present invention is directed to a much broader class of heat curable compositions comprising a much broader variety of cationically polymerizable organic materials as previously set forth in the specification as well as a broader variety of diaryliodonium salts and copper chelates. These results establish that copper chelates utilized in the practice of the present invention offer significant improvements over a variety of copper salts when utilized in combination with diaryliodonium salts with or without a reducing agent to effect the cure of a variety of cationically polymerizable organic materials.

What I claim as new and desire to secure by Letters Patent of the United States is:

1. Heat curable compositions comprising
   (A) a cationically polymerizable organic material,
   (B) a diaryliodonium salt and
   (C) a member selected from a copper chelate and a mixture of a copper chelate and a reducing agent.

2. A curable composition in accordance with claim 1, where the diaryliodonium salt is a diphenyliodonium hexafluorophosphate.

3. A curable composition in accordance with claim 1, where the diaryliodonium salt is diphenyliodonium hexafluoroarsenate.

4. A curable composition in accordance with claim 1, where the diaryliodonium salt is diphenyliodonium hexafluoroantimonate.

5. A curable composition in accordance with claim 1, where the cationically polymerizable organic polymer is an epoxy resin.

6. A curable composition in accordance with claim 1, where the copper chelate is copper acetylacetonate.

7. A curable composition in accordance with claim 1, where the copper chelate is copper salicylate.

8. A curable composition in accordance with claim 1, where the copper chelate is (copper chelate structure)

9. A curable composition in accordance with claim 1, where the reducing agent is stannous octoate.

10. A curable composition in accordance with claim 1, where the reducing agent is ascorbic acid.

11. A heat curable composition comprising
    (A) an epoxy resin,
    (B) a diaryliodonium salt having the formula, $$[(R)_a(R^1)_bI]^+[MQ_d]^-, \text{ and}$$

(C) a copper chelate, where R is a $C_{(6-13)}$ aromatic hydrocarbon radical, $R^1$ is a divalent aromatic organic radical, M is a metal or metalloid, Q is a halogen radical, a is equal to 0 or 2, b is equal to 0 or 1 and the sum of a+b is equal to 1 or 2, and d is an integer equal to 4–6.

12. A curable composition in accordance with claim 11, where the copper chelate is copper acetyl acetonate.

13. A curable composition in accordance with claim 11, where the copper chelate is

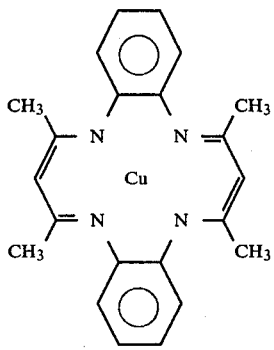

14. A curable composition in accordance with claim 11, where the diaryliodonium salt is diphenyliodonium hexafluoroarsenate.

15. A curable composition in accordance with claim 11, where the diaryliodonium salt is diphenyliodonium hexafluorophosphate.

16. A curable composition in accordance with claim 11, where the diaryliodonium salt is diphenyliodonium hexafluoroantimonate.

17. A heat curable composition comprising
(A) an epoxy resin,
(B) a diaryliodonium salt having the formula,

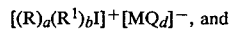

(C) a member selected from a copper chelate and a reducing agent, where R is a $C_{(6-13)}$ aromatic hydrocarbon radical, $R^1$ is a divalent aromatic organic radical M is a metal or metalloid, Q is a halogen radical, a is equal to 0 or 2, b is equal to 0 or 1 and the sum of a+b is equal to 1 or 2, and d is an integer equal to 4–6.

18. A heat curable composition in accordance with claim 17, where the reducing agent is stannous octoate.

19. A heat curable composition in accordance with claim 17, where the reducing agent is fructose.

20. A heat curable composition in accordance with claim 17, where the reducing agent is ascorbic acid.

21. A heat curable composition in accordance with claim 17, where the reducing agent is benzoin.

* * * * *